United States Patent
Radionov et al.

(10) Patent No.: US 12,191,921 B2
(45) Date of Patent: Jan. 7, 2025

(54) TWO DIMENSIONAL GAIN CALIBRATION FOR ANALOG COMPONENT

(71) Applicant: QUALCOMM Incorporated, San Diego, CA (US)

(72) Inventors: Anton Radionov, Plainsboro, NJ (US); Daniel James Flaccavento, Pittstown, NJ (US); Joel Taylor Garrell, Morristown, NJ (US); Herbert Eric Petrat, Bethlehem, PA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/659,106

(22) Filed: Apr. 13, 2022

(65) Prior Publication Data

US 2022/0337324 A1 Oct. 20, 2022

Related U.S. Application Data

(60) Provisional application No. 63/201,171, filed on Apr. 15, 2021.

(51) Int. Cl.
 *H04B 17/13* (2015.01)

(52) U.S. Cl.
 CPC .................... *H04B 17/13* (2015.01)

(58) Field of Classification Search
 CPC ............. H04W 24/10; H04W 24/08; H04W 72/541; H04W 52/241; H04W 24/02; H04W 72/542; H04W 88/08; H04W 52/243; H04W 28/04; H04W 72/0453; H04W 88/085; H04W 72/044; H04W 16/32; H04W 24/06; H04W 28/0236; H04W 36/08; H04W 36/20; H04W 40/02; H04W 40/12; H04W 72/29; H04B 17/336; H04B 1/1036; H04B 2001/1045; H04B 17/345; H04B 2001/1072; H04B 1/7097; H04B 10/25; H04B 17/309; H04B 2001/1054; H04B 2201/70728; H04B 17/318;
 (Continued)

(56) References Cited

U.S. PATENT DOCUMENTS 11,546,031 B2* 1/2023 Raghavan ............ H04B 7/0695
2018/0019782 A1* 1/2018 Yun ........................ H03F 3/19
(Continued)

*Primary Examiner* — Golam Sorowar
(74) *Attorney, Agent, or Firm* — Harrity & Harrity, LLP

(57) ABSTRACT

Various aspects of the present disclosure generally relate to wireless communication. In some aspects, a device may identify, for a set of frequency values and a set of temperature values, characterization gain values associated with an analog component. The device may determine a frequency contribution based at least in part on comparing a first observed gain associated with a reference frequency and a second observed gain associated with a target frequency. The device may determine a temperature contribution based at least in part on comparing a first characterization gain value associated with a reference temperature and a second characterization gain value associated with a target temperature. The device may determine a gain offset for the target temperature and the target frequency based at least in part on combining the frequency and temperature contributions. The device may configure the gain offset for the analog component. Numerous other aspects are described.

30 Claims, 5 Drawing Sheets

300

(58) Field of Classification Search
CPC ............... H04B 7/0617; H04B 1/0475; H04B 1/7087; H04B 1/71; H04B 1/711; H04B 1/715; H04L 5/0073; H04L 5/006; H04L 5/0023; H04L 5/0021; H04L 5/001; H04L 5/0053; H04L 43/16; H04L 5/0082; H04L 1/0021; H04L 1/0026; H04L 1/242; H04L 41/0823; H04L 41/12; H04L 43/0829; H04L 43/0852; H04L 43/50; H04L 45/22; H04L 45/243; H04L 45/28; H04L 69/323
See application file for complete search history.

(56) References Cited

U.S. PATENT DOCUMENTS

| | | | |
|---|---|---|---|
| 2018/0092048 A1* | 3/2018 | Cheng | H04B 17/13 |
| 2019/0082394 A1 | 3/2019 | Abdelmonem et al. | |
| 2019/0327694 A1* | 10/2019 | Zur | H04W 52/38 |

* cited by examiner

TWO DIMENSIONAL GAIN CALIBRATION FOR ANALOG COMPONENT

CROSS-REFERENCE TO RELATED APPLICATION

This Patent Application claims priority to U.S. Provisional Patent Application No. 63/201,171, filed on Apr. 15, 2021, entitled "TWO DIMENSIONAL GAIN CALIBRATION FOR ANALOG COMPONENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for two dimensional gain calibration for analog components.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method includes identifying, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values; determining a frequency contribution based at least in part on comparing a first observed gain associated with a reference frequency of the set of frequency values and a second observed gain associated with a target frequency, wherein the first observed gain and the second observed gain are dependent on an operating temperature of the analog component; determining a temperature contribution based at least in part on comparing a first characterization gain value, of the set of characterization gain values, associated with a reference temperature of the set of temperature values, and a second characterization gain value, of the characterization gain values, associated with a target temperature; determining a gain offset for the target temperature and the target frequency based at least in part on combining the frequency contribution and the temperature contribution; and configuring the gain offset, associated with the target temperature and the target frequency, for the analog component.

In some aspects, a device for wireless communication includes a memory and one or more processors, coupled to the memory, configured to identify, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values; determine a frequency contribution based at least in part on comparing a first observed gain associated with a reference frequency of the set of frequency values and a second observed gain associated with a target frequency, wherein the first observed gain and the second observed gain are dependent on an operating temperature of the analog component; determine a temperature contribution based at least in part on comparing a first characterization gain value, of the set of characterization gain values, associated with a reference temperature of the set of temperature values, and a second characterization gain value, of the characterization gain values, associated with a target temperature; determine a gain offset for the target temperature and the target frequency based at least in part on combining the frequency contribution and the temperature contribution; and configure the gain offset, associated with the target temperature and the target frequency, for the analog component.

In some aspects, a non-transitory computer-readable medium storing a set of instructions for wireless communication includes one or more instructions that, when executed by one or more processors of a device, cause the device to identify, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values; determine a frequency contribution based at least in part on comparing a first observed gain associated with a reference frequency of the set of frequency values and a second observed gain associated with a target frequency, wherein the first observed gain and the second observed gain are dependent on an operating temperature of the analog component; determine a temperature contribution based at least in part on comparing a first characterization gain value, of the set of characterization gain values, associated with a reference temperature of the set of temperature values, and a second characterization gain value, of the characterization gain values, associated with a target temperature; determine a gain offset for the target temperature and the target frequency based at least in part on combining the frequency contribution and the temperature contribution; and configure the gain offset, associated with the target temperature and the target frequency, for the analog component.

In some aspects, an apparatus for wireless communication includes means for identifying, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values; means for determining a frequency contribution based at least in part on comparing a first observed gain associated with a reference frequency of the set of frequency values and a second observed gain associated with a target frequency, wherein the first observed gain and the second observed gain are dependent on an operating temperature of the analog component; means for determining a temperature contribution based at least in part on comparing a first characterization gain value, of the set of characterization gain values, associated with a reference temperature of the set of temperature values, and a second characterization gain value, of the characterization gain values, associated with a target temperature; means for determining a gain offset for the target temperature and the target frequency based at least in part on combining the frequency contribution and the temperature contribution; and means for configuring the gain offset, associated with the target temperature and the target frequency, for the analog component.

Aspects generally include a method, apparatus, system, computer program product, non-transitory computer-readable medium, user equipment, network entity, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
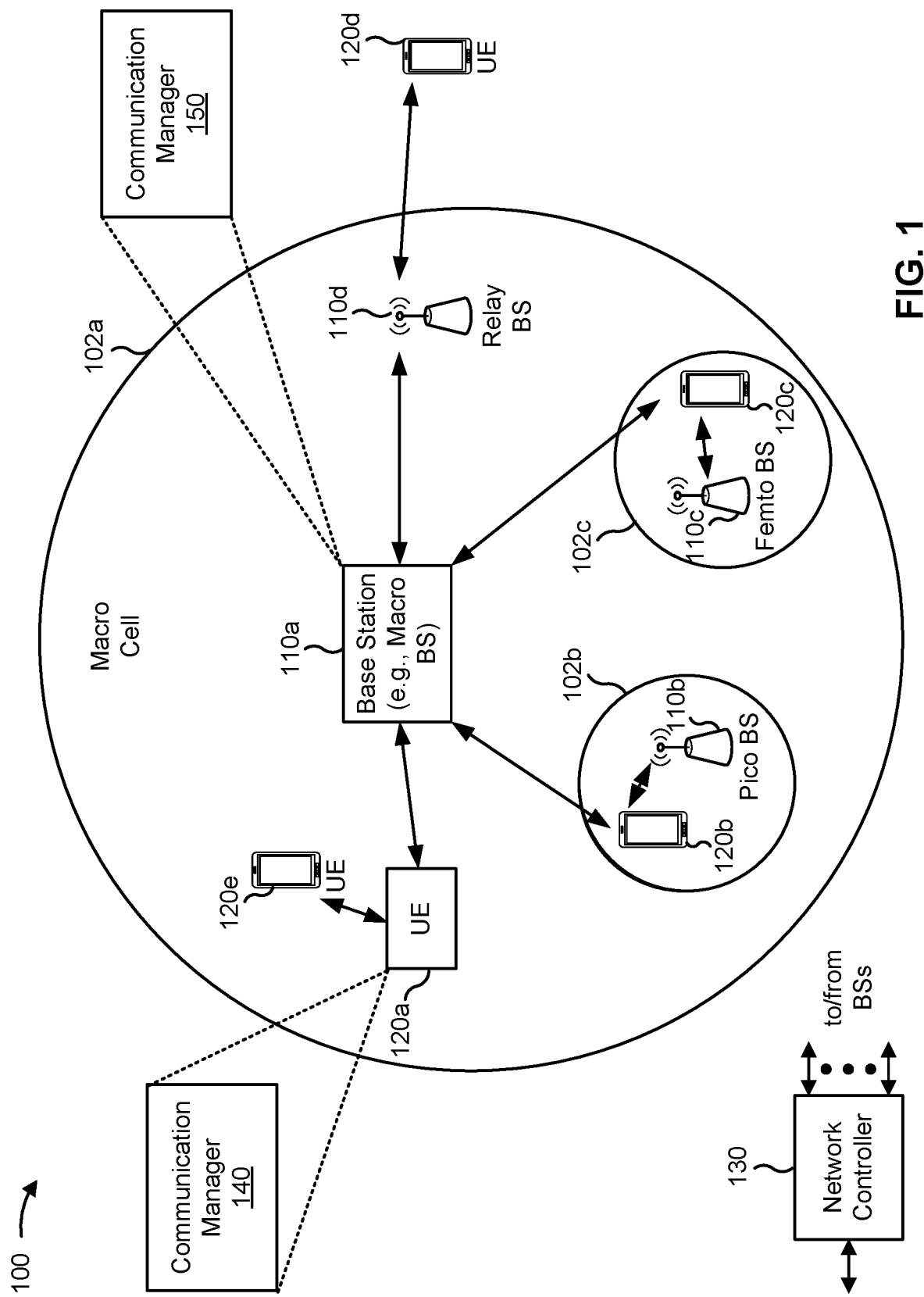
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the device may include a communication manager 140. As described in more detail elsewhere herein, the communication manager 140 may identify, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values; determine a frequency contribution based at least in part on comparing a first observed gain associated with a reference frequency of the set of frequency values and a second observed gain associated with a target frequency, wherein the first observed gain and the second observed gain are dependent on an operating temperature of the analog component; determine a temperature contribution based at least in part on comparing a first characterization gain value, of the set of characterization gain values, associated with a reference temperature of the set of temperature values, and a second characterization gain value, of the characterization gain values, associated with a target temperature; determine a gain offset for the target temperature and the target frequency based at least in part on combining the frequency contribution and the temperature contribution; and configure the gain offset, associated with the target temperature and the target frequency, for the analog component. Additionally, or alternatively, the communication manager 140 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
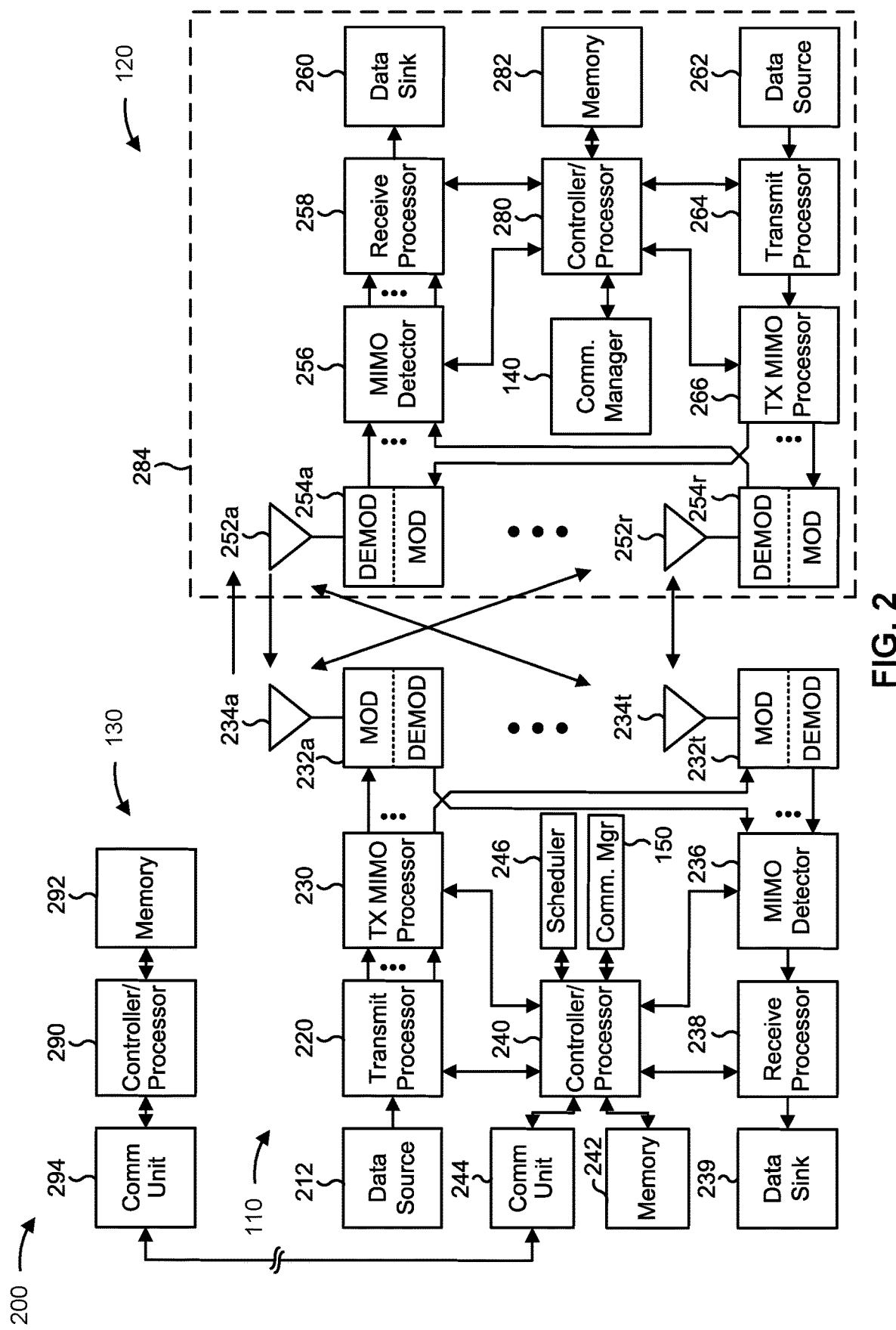
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4 and 5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4 and 5).

Controller/processor 240 of base station 110, controller/processor 280 of UE 120, and/or any other component(s) of FIG. 2 may perform one or more techniques associated with two dimensional gain calibration for analog components, as described in more detail elsewhere herein. For example, controller/processor 240 of base station 110, controller/processor 280 of UE 120, and/or any other component(s) of FIG. 2 may perform or direct operations of, for example, process 400 of FIG. 4, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, and/or other processes as described herein. In some aspects, executing instructions may include running the instructions, converting the instructions, compiling the instructions, and/or interpreting the instructions, among other examples.

In some aspects, the device includes means for identifying, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values; means for determining a frequency contribution based at least in part on comparing a first observed gain associated with a reference frequency of the set of frequency values and a second observed gain associated with a target frequency, wherein the first observed gain and the second observed gain are dependent on an operating temperature of the analog component; means for determining a temperature contribution based at least in part on comparing a first characterization gain value, of the set of characterization gain values, associated with a reference temperature of the set of temperature values, and a second characterization gain value, of the characterization gain values, associated with a target temperature; means for determining a gain offset for the target temperature and the target frequency based at least in part on combining the frequency contribution and the temperature contribution; and/or means for configuring the gain offset, associated with the target temperature and the target frequency, for the analog component. In some aspects, the means for the device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the device to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
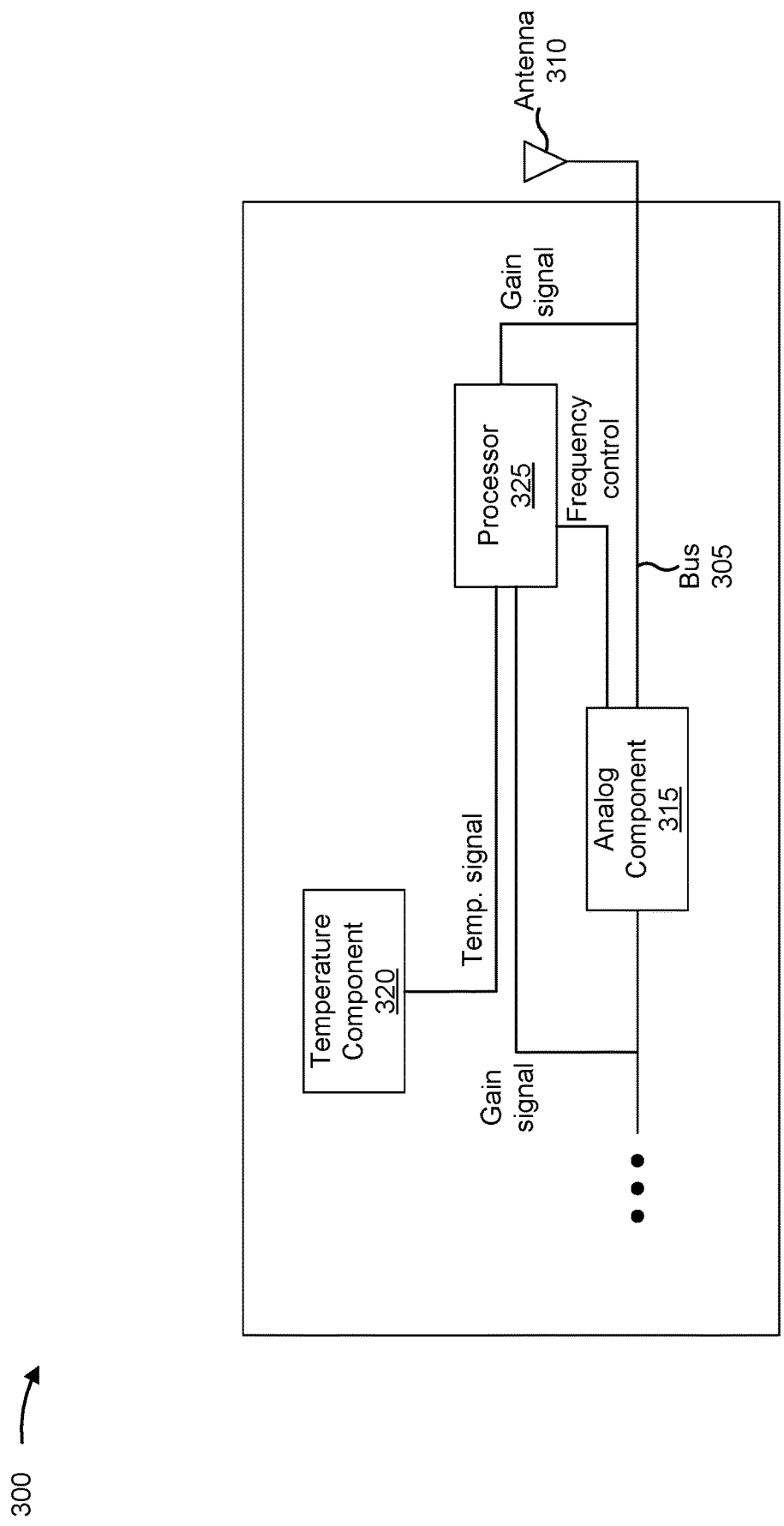
FIG. 3 is a diagram illustrating an example of a device configured to perform two dimensional gain calibration for an analog component, in accordance with the present disclosure.

FIG. 3 is a diagram illustrating an example 300 of a device (e.g., base station 110, UE 120, a radio unit, and/or another type of device, such as a wireless communication device having a Bluetooth radio, a WiFi radio, or the like) configured to perform two dimensional gain calibration for an analog component, in accordance with the present disclosure. As shown in FIG. 3, device 300 includes a bus 305, an antenna 310, an analog component 315, a temperature component 320, and a processor 325. The bus 305 includes one or more components that enable wired and/or wireless communication among the components of device 300.

The antenna 310 may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, as described above with respect to FIG. 2.

The analog component 315 includes an analog component associated with performing radio frequency (RF) operations. For example, the analog component 315 may include a bandpass filter, an RF circuit, and/or the like. In some aspects, the analog component 315 may experience gain and/or loss variations over operating frequency ranges and/or over operating temperature frequency ranges. It should be noted that the analog component 315 can include multiple analog components. For example, the techniques and apparatuses described herein can be applied for a group of analog components, such as for a radio frequency chain or a radio-frequency front-end. As another example, the techniques and apparatuses described herein can be applied at a per-device granularity, such that a gain offset is determined and configured for all communication components of a device.

The temperature component 320 includes one or more temperature sensor components configured to sense an operating temperature associated with the device 300 and/or a component of the device 300 (e.g., the antenna 310, the analog component 315, the processor 325, and/or the like). For example, the temperature component 320 may include a thermistor, such as a positive temperature coefficient (PTC)-type thermistor or a negative temperature coefficient (NTC)-type thermistor. In some aspects, the temperature component 320 may include another type of temperature sensor component, such as a thermocouple, a resistance temperature device (RTD), a semiconductor-based thermometer, an infrared-based thermometer, and/or the like. In some aspects, the temperature component 320 provides a temperature signal to the processor 325. The temperature signal may include or may be used to determine temperature measurement data indicating a current operating temperature of the analog component 315, as described elsewhere herein.

The processor 325 includes a central processing unit, a graphics processing unit, a microprocessor, a controller, a microcontroller, a digital signal processor, a field-programmable gate array, an application-specific integrated circuit, and/or another type of processing component. The processor 325 may be implemented in hardware, firmware, or a combination of hardware and software. In some aspects, processor 325 may correspond to controller/processor 240 and/or controller/processor 280, described above with respect to FIG. 2.

In some aspects, the processor 325 includes one or more processors capable of being programmed to perform a function associated with two dimensional gain calibration for the analog component 315, as described elsewhere herein. In some aspects, the processor 325 may perform the function based at least in part on a set of signals. For example, the processor 325 may perform the function based at least in part on a temperature signal received from the temperature component 320, a frequency signal associated with an operating frequency of the analog component 315, a gain signal associated with a gain value associated with the analog component 315, and/or the like.

As an example, the device 300 may comprise a wireless communication device (e.g., the base station 110, the UE 120, and/or the like) and the analog component 315 may experience gain and/or loss variations over a set of operating frequencies and/or over a range of operating temperatures. To enable optimum performance of the wireless communication device and/or to enable the wireless communication device to conform to one or more operating standards (e.g., one or more wireless communication device standards), the processor 325 may utilize the temperature signal, the frequency signal, and/or the gain signal to configure the analog component 315 to compensate for the gain and/or loss variations over the set of operating frequencies and/or over the range of operating temperatures.

However, in some cases, the analog component 315's gain and/or loss variations experienced over a set of operating frequencies are dependent upon an operating temperature of the wireless communication device and/or the analog component 315. To compensate for these gain and/or loss variations, the wireless communication device (e.g., the analog component 315) may be calibrated over a set of operating frequencies associated with the wireless communication device and/or the analog component 315, such that the analog component 315's gain is less variable across the set of operating frequencies.

Additionally, the wireless communication device may be calibrated over a set of operating temperature ranges. Typically, this calibration is required to be performed in factory (e.g., by the manufacturer of the device 300). However, calibration of every wireless communication device manufactured by a manufacturer over a set of operating temperature ranges associated with the wireless communication device may not be practical and/or may be cost prohibitive. Therefore, calibration for the gain and/or loss variations over the set of operating temperature ranges may be performed and/or characterized over a sample set of wireless communication devices and applied to all wireless communication devices of a same type and/or configuration as the sample set of wireless communication devices.

The wireless communication devices may be calibrated based at least in part on data associated with calibrating the wireless communication devices over the set of frequency ranges and the characterized data associated with calibration of the sample set of wireless devices over the set of operating temperature ranges. However, it may be difficult to effectively and accurately compensate gain and/or loss variations over operating frequencies that are affected by operating temperature of the device. For example, if a wireless communication device performs a first compensation operation based only on frequency gain calibration and a second compensation operation based only on temperature gain calibration (such as at a given frequency), then the wireless communication device may fail to take into account the effect of the operating temperature on the operating frequency.

Some techniques and apparatuses described herein enable data associated with calibrating the wireless communication devices over the set of frequency ranges and characterized data associated with calibration of a sample set of wireless devices over the set of operating temperature ranges to be effectively and accurately combined to compensate for gain and/or loss variations over operating frequencies that change based at least in part on the operating temperatures of the wireless communication device. For example, a device (e.g., device 300) may characterize gain and/or loss variations over multiple frequencies within an operating frequency range of a wireless communication device (e.g., device 300, base station 110, and/or UE 120). The device may characterize the gain and/or loss variations over the multiple frequencies for multiple operating temperatures within an operating temperature range of the wireless communication device. Based at least in part on the characterization, the device may create two dimensional gain and/or loss lookup tables. A first dimension of the two dimensional gain and/or loss lookup tables may be an internal device temperature and a second dimension may be an operating frequency. For example, the device may configure a table and/or a function in a memory of the device that identifies gain offsets for combinations of target temperatures and target frequencies. A lookup table, as described above, may be determined in a fashion that takes into account the effect of operating temperature on gain at a given frequency (that is gain/loss variation that changes at an operating frequency based at least in part on an operating temperature). By determining and using the two dimensional lookup table, the device can more efficiently compensate gain effects due to frequency and temperature, both taken separately and in combination. In this way, the efficiency of the UE is improved, power management is improved, and reliability of communications is improved.

While blocks in FIG. 3 are illustrated as distinct components, the functions described above with respect to the blocks may be implemented in a single hardware, software, or combination component or in various combinations of components. For example, processor 325 may be implemented in a device separate from device 300, such as a wireless communication device configured to provide signals to the device 300 to cause the processor 325 to perform two dimensional gain calibration for the analog component 315.

As indicated above, FIG. 3 is provided as an example. Other examples may differ from what is described with regard to FIG. 3.

Figure 4:
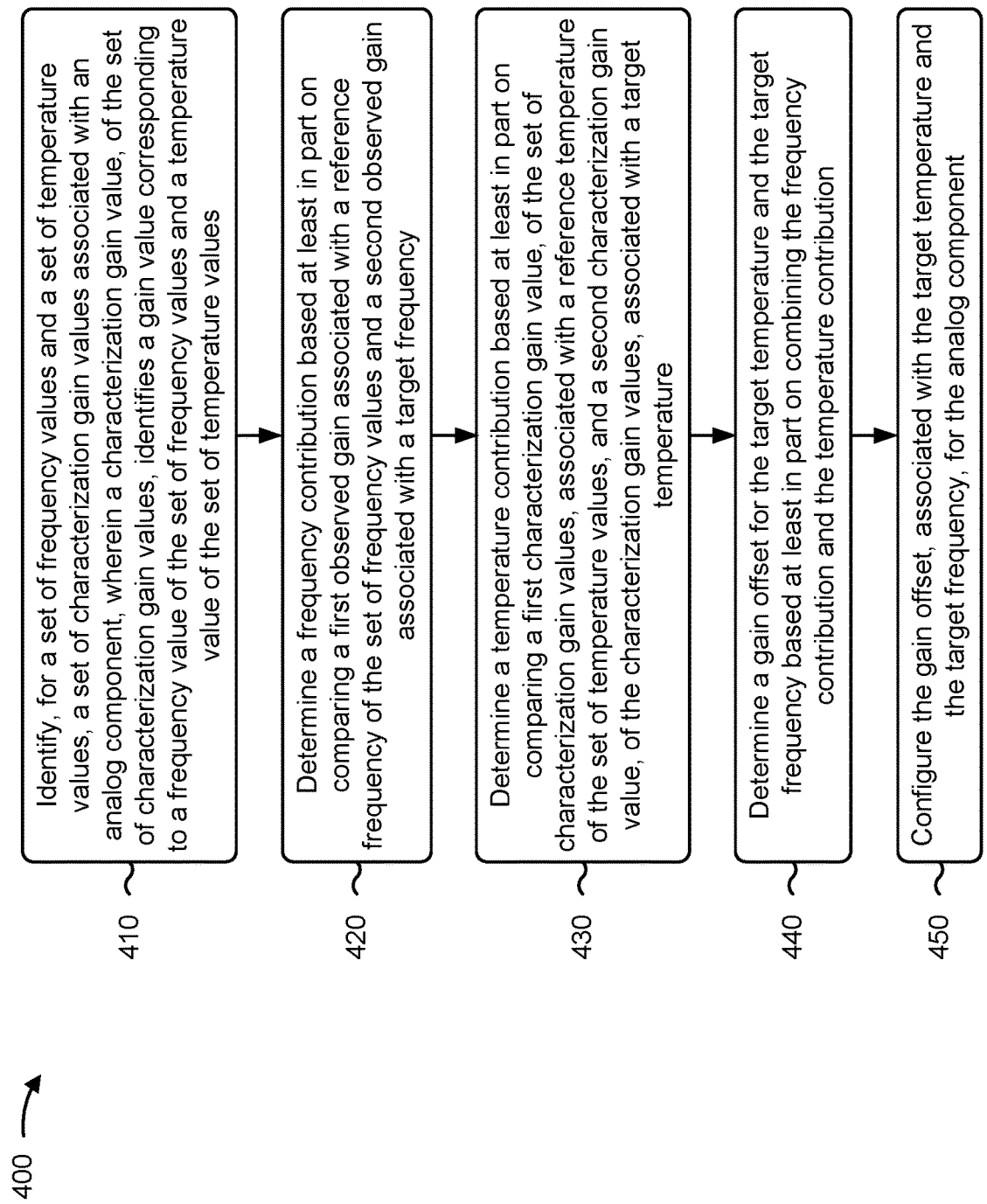
FIG. 4 is a diagram illustrating an example process associated with two dimensional gain calibration for an analog component, in accordance with the present disclosure.

FIG. 4 is a diagram illustrating an example process 400 performed, for example, by a device, in accordance with the present disclosure. Example process 400 is an example where the device (e.g., device 300, base station 110, and/or UE 120) performs operations associated with two dimensional gain calibration for an analog component. In some aspects, at least one of the operations of FIG. 4 may be performed by a device external to the device, such as a calibration device or the like.

As shown in FIG. 4, in some aspects, process 400 may include identifying, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values (block 410). For example, the device (e.g., using antenna 310, analog component 315, temperature component 320, and/or processor 325, depicted in FIG. 3) may identify, for a set of frequency values and a set of temperature values, a set of characterization gain values associated with an analog component (e.g., analog component 315). In some aspects, a characterization gain value, of the set of characterization gain values, identifies a gain value corresponding to a frequency value of the set of frequency values and a temperature value of the set of temperature values. In some aspects, the set of characterization gain values are constant per device design.

In some aspects, identifying the set of characterization gain values associated with the analog component includes receiving the set of characterization gain values. For example, the device may receive the set of characterization gain values from another device. In some aspects, the other device may determine the set of characterization gain values. In other aspects, the other device may receive the set of characterization gain values, such as based at least in part on a user inputting the set of characterization gain values via a user interface associated with the device and/or the other device, and/or the like.

In some aspects, identifying the set of characterization gain values associated with the analog component includes determining the set of characterization gain values. In some aspects, a characterization gain value, of the set of characterization gain values, may identify a gain value corresponding to a frequency value of a set of frequency values and a temperature value of a set of temperature values. For example, the device may determine gain and/or loss variations over a set of frequency values within an operation frequency range associated with the analog component for a set of temperature values within an operating temperature range associated with the analog component.

In some aspects, the set of frequency values span the operating frequency range associated with the analog component. In some aspects, the set of temperature values span the operating temperature range associated with the analog component. For example, if the analog component is expected to operate in a frequency range of 3300-3500 MHz and a temperature range of 0-60 degrees Celsius, the set of frequency values may span the frequency range of 3300-3500 MHz and the set of temperature values may span the temperature range of 0-60 degrees Celsius.

As further shown in FIG. 4, in some aspects, process 400 may include determining a frequency contribution based at least in part on comparing a first observed gain associated with a reference frequency of the set of frequency values and a second observed gain associated with a target frequency, wherein the first observed gain and the second observed gain are dependent on an operating temperature of the analog component (block 420). For example, the device (e.g., using antenna 310, analog component 315, temperature component 320, and/or processor 325, depicted in FIG. 3) may determine a frequency contribution based at least in part on comparing a first observed gain associated with a reference frequency of the set of frequency values and a second observed gain associated with a target frequency. In some aspects, the first observed gain and the second observed gain may be dependent on an operating temperature of the analog component.

In some aspects, the device determines the first observed gain, the second observed gain, and/or the target temperature based at least in part on a set of signals received from another device. For example, a computing device associated with the device may be configured to determine a gain offset associated with the analog component. The computing device may provide, to the device, a first signal indicating the first observed gain, a second signal indicating the second observed gain, and/or a third signal indicating the target temperature to enable the device to determine the frequency contribution.

In some aspects, the device determines the first observed gain and the second observed gain while the analog component is associated with a target temperature and/or based at least in part on calibrating the analog component. For example, during a process associated with calibrating the analog component, the device may determine the first observed gain while the analog component operates at the reference frequency and the target temperature. The device may determine the second observed gain while the analog component operates at the target frequency and the target temperature.

As further shown in FIG. 4, in some aspects, process 400 may include determining a temperature contribution based at least in part on comparing a first characterization gain value, of the set of characterization gain values, associated with a reference temperature of the set of temperature values, and a second characterization gain value, of the characterization gain values, associated with a target temperature (block 430). For example, the device (e.g., using antenna 310, analog component 315, temperature component 320, and/or processor 325, depicted in FIG. 3) may determine a temperature contribution based at least in part on comparing a first characterization gain value, of the set of characterization gain values, associated with a reference temperature of the set of temperature values, and a second characterization gain value, of the characterization gain values, associated with a target temperature.

In some aspects, the device determines the second characterization gain value using a given temperature value, of the set of temperature values. In some aspects, the given temperature value is closer to the target temperature than any other temperature value of the set of temperature values.

In some aspects, the device may perform interpolation to determine the given temperature value and/or the second characterization gain value based at least in part on the set of temperature values. For example, a value of the target temperature may be between a first temperature value and a second temperature value. The device may perform interpolation on the set of temperature values and/or characterization gain values associated with the set of temperature values to determine the given temperature value and/or the second characterization gain value, respectively.

In some aspects, the device may perform extrapolation to determine the given temperature value and/or the second characterization gain value based at least in part on the set of temperature values. For example, a value of the target temperature may be outside of a range of temperature values of the set of temperature values (e.g., the target temperature may be greater than a maximum temperature value, of the set of temperature value or less than a minimum temperature value, of the set of temperature values). The device may perform extrapolation on the set of temperature values and/or characterization gain values associated with the set of temperature values to determine the given temperature value and/or the second characterization gain value, respectively.

As further shown in FIG. 4, in some aspects, process 400 may include determining a gain offset for the target temperature and the target frequency based at least in part on combining the frequency contribution and the temperature contribution (block 440). For example, the device (e.g., using antenna 310, analog component 315, temperature component 320, and/or processor 325, depicted in FIG. 3) may determine a gain offset for the target temperature and the target frequency based at least in part on combining the frequency contribution and the temperature contribution.

As further shown in FIG. 4, in some aspects, process 400 may include configuring the gain offset, associated with the target temperature and the target frequency, for the analog component (block 450). For example, the device (e.g., using antenna 310, analog component 315, temperature component 320, and/or processor 325, depicted in FIG. 3) may configure the gain offset, associated with the target temperature and the target frequency, for the analog component. In some aspects, the device configures the gain offset for the analog component based at least in part on configuring a table and/or a function identifying gain offsets for combinations of target temperatures and target frequencies.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
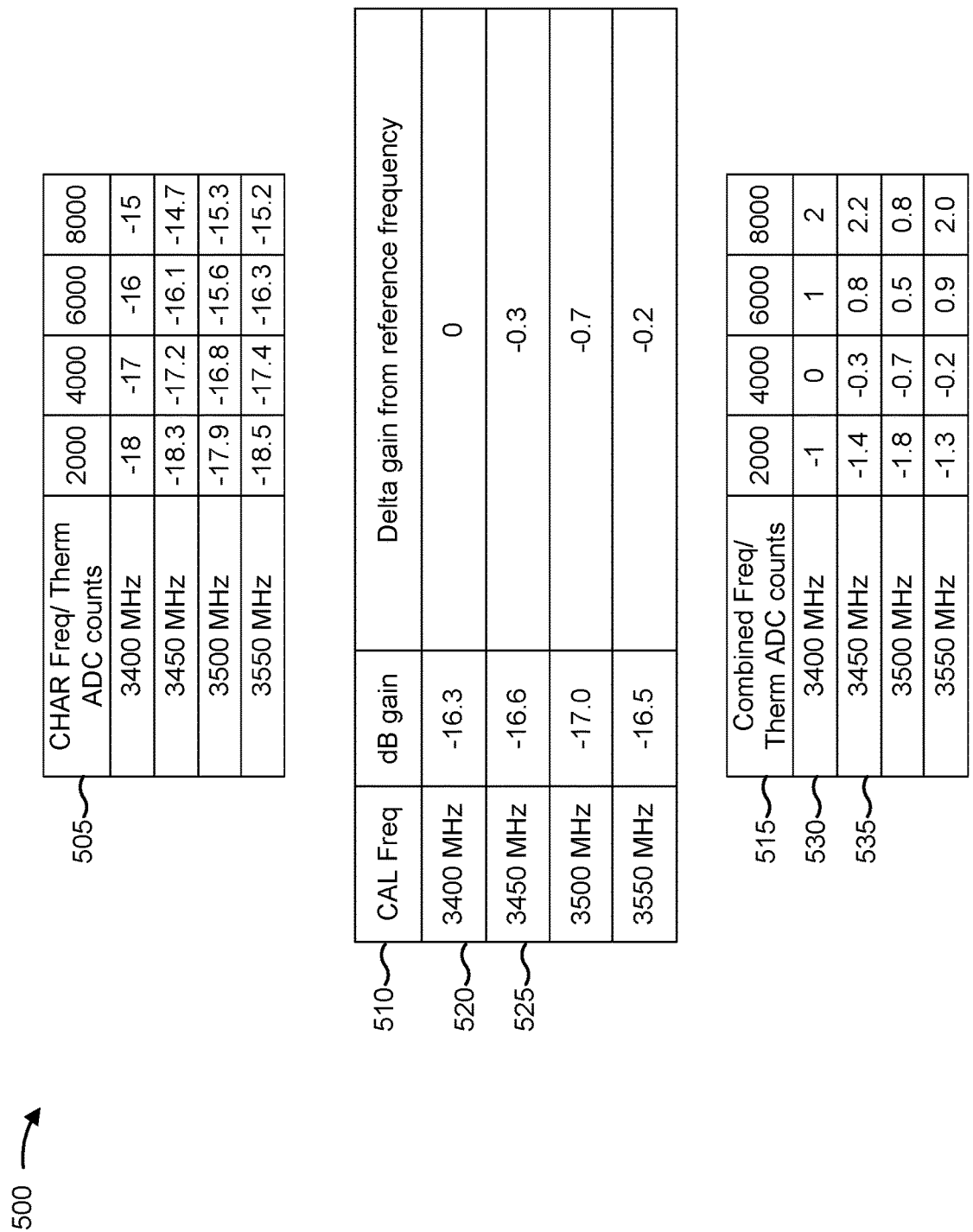
FIG. 5 is a diagram illustrating an example associated with two dimensional gain calibration for an analog component, in accordance with the present disclosure.

FIG. 5 is a diagram illustrating an example 500 associated with two dimensional gain calibration for an analog component, in accordance with the present disclosure. As shown in FIG. 5, example 500 includes a feedback receiver (FBRx) characterization table 505, an over frequency calibration table 510, and a combined calibration table 515.

The FBRx characterization table 505 may include characterization data that characterizes gain and/or loss variations of a sample group of wireless communication devices. While example 500 relates to an FBRX, the techniques of example 500 can be applied for analog devices associated with reception, transmission, feedback receivers (FBRx), or the like. The sample group can include any number of wireless communication devices. The gain and/or loss variations may be characterized based at least in part on determining calibration data for the sample group of wireless communication devices on multiple frequencies over an operations frequency range of the sample group of wireless communication devices for multiple temperatures spanning an operating temperature range associated with the sample group of wireless communication devices.

As shown, the FBRx characterization table 505 includes a plurality of rows and a plurality of columns. Each column is associated with a respective operating temperature. As shown in FIG. 5, each column of the FBRx characterization table 505 is associated with a respective thermistor analog-to-digital (ADC) count indicating a respective operating temperature within a range of operating temperatures associated with the sample group of wireless communication devices. Alternatively, or additionally, each column of the FBRx characterization table 505 may be associated with a respective operating temperature represented in another form (e.g., degrees).

As also shown in FIG. 5, each row of the FBRx characterization table 505 is associated with a respective operating frequency within a range of operating frequencies associated with the sample group of wireless communication devices. For a wireless communication device, of the sample group of wireless communications devices, a device (e.g., device 300, base station 110, UE 120, and/or another device) may determine calibration data (e.g., an FBRx gain value) for the wireless communication device on multiple frequencies (e.g., 3400 MHz, 3450 MHz, 3500 MHz, and 3550 MHz, as shown) for multiple temperatures indicated by respective thermistor ADC counts (e.g., 2000, 4000, 6000, and 8000, as shown). The device may characterize the calibration data determined for the sample group of wireless communication devices and may generate the FBRx characterization table 505 based at least in part on the characterized calibration data. Each value in the FBRx characterization table 505 is a characterization gain value corresponding to a temperature value and a frequency value. Using the table 505 alone to calibrate the device's gain offset may provide an unsatisfactory result that fails to take into account the individual device's calibration (which is indicated by table 510).

The over frequency calibration table 510 may include calibration data determined for a particular wireless communication device. Table 510 shows gain/loss values (referred to herein as observed gains) across a range of frequencies—hence, table 510 is referred to as an "over frequency" calibration table. The particular wireless communication device may be calibrated over multiple operating frequencies within an operating frequency range of the particular wireless communication device at a particular temperature (which may be enforced for the device by a test chamber or may be an environmental temperature that is observed by the device). For each frequency of table 510, the device may determine a gain value (e.g., an FBRx gain value) and a delta gain value indicating a change in the gain value relative to a gain value determined for a reference frequency. Either or both of the gain value or the delta gain value can be referred to herein as an observed gain. In some aspects, the multiple operating frequencies indicated in the over frequency calibration table 510 are the same as the frequencies indicated in the FBRx characterization table 505.

As shown by reference number 520, the device determines a reference frequency of 3400 MHz. The device determines a gain value of −16.3 dB for the reference frequency. The device determines a delta gain value of 0 dB based at least in part on 3400 MHz being the reference frequency.

The device may calibrate the wireless communication device at a next frequency (e.g., 3450 MHz, as shown, though any step size of frequency can be used) and the particular temperature. As shown by reference number 525, the device includes an entry indicating a gain value of −16.6 dB and a delta gain value of −0.3 (e.g., −16.6−(−16.3)) for the next frequency. The device may calibrate the wireless communication device at multiple frequencies and at the particular temperature and may include respective entries in the over frequency calibration table 510 for each frequency at which the device is calibrated in a similar manner to generate the over frequency calibration table 510. Table 510 can be determined by the device or another device external to the device.

The combined calibration table 515 may include combined calibration data associated with the device (e.g., the device associated with the over frequency calibration table 510). The device may generate the combined calibration table 515 based at least in part on combining the FBRx characterization table 505 and the over frequency calibration table 510.

In some aspects, the device combines the FBRx characterization table 505 and the over frequency calibration table 510 based at least in part on a frequency contribution and a temperature contribution. The device may determine a frequency contribution based at least in part on comparing a first observed gain associated with the reference frequency and a second observed gain associated with a target frequency. For example, the device may determine a reference frequency of 3400 MHz based at least in part on 3400 MHz being indicated as the reference frequency in the over frequency calibration table 510.

The first observed gain and/or the second observed gain may be dependent on an operating temperature of the device and/or an analog component of the device. The device may determine the particular temperature at which the calibration in the over frequency calibration table 510 was determined. The device may identify a temperature indicated in the FBRx characterization table 505 based at least in part on the particular temperature.

In some aspects, the device identifies a temperature indicated in the FBRx characterization table 505 that is closest to the particular temperature at which the calibration in the over frequency calibration table 510 was determined. For example, the particular temperature at which the calibration in the over frequency calibration table 510 was determined may be a temperature corresponding to a thermistor ADC count of 4200. The device may identify the temperature indicated in the FBRx characterization table 505 as a temperature corresponding to a thermistor ADC count of 4000 based at least in part on 4000 being closest to 4200 relative to the other thermistor ADC counts indicated in the FBRx characterization table 505. Alternatively, the device may perform interpolation based at least in part on the thermistor ADC count of 4200.

The device may determine a respective delta gain value for the reference frequency over a set of temperatures based at least in part on the FBRx characterization table 505. The delta gain value for a first temperature may indicate a change in a gain value indicated for the reference frequency and the first temperature in the FBRx characterization table 505, relative to the gain value indicated for the reference frequency and the temperature that is closest to the particular temperature (e.g., the reference temperature).

For example, as shown by reference number 530, the device determines a delta gain value of 0 for the frequency 3400 MHz and the temperature corresponding to the thermistor ADC count of 4000 based at least in part on 4000 being closest to 4200 relative to the other thermistor ADC counts indicated in the FBRx characterization table 505. The device determines a delta gain value of −1 for the frequency 3400 MHz and the temperature corresponding to the thermistor ADC count of 2000 (e.g., −18−(−17)=−1). The device determines a delta gain value of 1 for the frequency 3400 MHz and the temperature corresponding to the thermistor ADC count of 6000 (e.g., −16−(−17)=1). The device determines a delta gain value of 2 for the frequency 3400 MHz and the temperature corresponding to the thermistor ADC count of 8000 (e.g., −15−(−17)=2).

The device may determine a set of delta gain values for a next frequency based at least in part on a frequency contribution and a temperature contribution. The device may determine the frequency contribution based at least in part on the delta gain value indicated for the next frequency in the over frequency calibration table 510. For example, for the frequency 3450 MHz, the device may determine the frequency contribution as −0.3 based at least in part on the over frequency calibration table 510 indicating −0.3 as the delta gain value for the frequency 3450 MHz.

The device may determine a temperature contribution associated with a first temperature (e.g., a temperature corresponding to a thermistor ADC count of 2000). The device may determine the temperature contribution associated with the first temperature based at least in part on a different between a gain value indicated in the FBRx characterization table 505 for the next frequency at the first temperature and a gain value indicated in the FBRx characterization table 505 for the next frequency at the reference temperature.

As an example, for the frequency 3450 MHz, the device may determine a gain value of −18.3 associated with the first temperature based at least in part on the FBRx characterization table 505. The device may determine a gain value of −17.2 associated with the reference temperature based at least in part on the FBRx characterization table 505. The device may determine a frequency contribution of −1.1 based at least in part on a difference between the gain value associated with the first temperature and the gain value associated with the reference temperature (e.g., −18.3−(−17.2)=−1.1). Thus, the device takes into account the effect of temperature on gain/loss at a given frequency by comparing the reference temperature's gain/loss at the given frequency and the first temperature's gain/loss at the given frequency.

The device may determine a combined gain value based at least in part on the frequency contribution and the temperature contribution. For example, the device may determine the combined gain value based at least in part on adding the frequency contribution and the temperature contribution. As shown by reference number 535, the device determines −1.4 for the combined gain value associated with the first frequency (e.g., −1.1+−0.3=−1.4). The device may determine combined gain values for each frequency of a set of frequencies over multiple temperatures in a similar manner. If the device is to perform a communication at a given frequency and temperature, the device may identify a combined gain value according to table 515, and may apply the combined gain value (such as by configuring the analog component(s) of the device to use the combined gain value). In this way, the device may account for temperature's effect on gain/loss at a given operating frequency (by comparing reference temperature gain/loss and target temperature gain/loss in table 505) and may take into account the device's frequency contribution to gain/loss by reference to table 510).

It should be noted that the operations described with regard to FIG. 5 can be performed on the fly—in other words, the device can determine a single combined gain value for a target frequency and temperature by reference to tables 505 and 510 and by performing the operations described in example 500 without generating a table 515. Performing these operations on the fly may conserve storage space, whereas generating a table 515 may expedite the determination of the combined gain value for a communication.

As indicated above, FIG. 5 is provided as an example. Other examples may differ from what is described with respect to FIG. 5.

The following provides an overview of some Aspects of the present disclosure:

Aspect 1: A method, comprising: identifying, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values; determining a frequency contribution based at least in part on comparing a first observed gain associated with a reference frequency of the set of frequency values and a second observed gain associated with a target frequency, wherein the first observed gain and the second observed gain are dependent on an operating temperature of the analog component; determining a temperature contribution based at least in part on comparing a first characterization gain value, of the set of characterization gain values, associated with a reference temperature of the set of temperature values, and a second characterization gain value, of the characterization gain values, associated with a target temperature; determining a gain offset for the target temperature and the target frequency based at least in part on combining the frequency contribution and the temperature contribution; and configuring the gain offset, associated with the target temperature and the target frequency, for the analog component.

Aspect 2: The method of Aspect 1, further comprising determining the first observed gain and the second observed gain while the analog component is associated with the target temperature.

Aspect 3: The method of Aspect 2, wherein determining the first observed gain and the second observed gain while the analog component is associated with the target temperature further comprises calibrating the analog component; determining the first observed gain while the analog component operates at the reference frequency and the target temperature; and determining the second observed gain while the analog component operates at the target frequency and the target temperature.

Aspect 4: The method of any of Aspects 1 through 3, further comprising determining the second characterization gain value using a given temperature value of the set of temperature values, wherein the given temperature value is closer to the target temperature than any other temperature value of the set of temperature values.

Aspect 5: The method of any of Aspects 1 through 4, wherein the set of temperature values span an operating temperature range of the analog component.

Aspect 6: The method of any of Aspects 1 through 5, wherein the set of frequency values span an operating frequency range of the analog component.

Aspect 7: The method of any of Aspects 1 through 6, further comprising receiving a first signal indicating the target temperature; receiving a second signal indicating the first observed gain; and receiving a third signal indicating the second observed gain.

Aspect 8: The method of any of Aspects 1 through 3, wherein configuring the gain offset for the analog component associated with the target temperature and the target frequency further comprises configuring a table or a function identifying gain offsets for combinations of target temperatures and target frequencies.

Aspect 9: An apparatus for wireless communication at a device, comprising a processor; memory coupled with the processor; and instructions stored in the memory and executable by the processor to cause the apparatus to perform the method of one or more of Aspects 1 through 8.

Aspect 10: A device for wireless communication, comprising a memory and one or more processors coupled to the memory, the one or more processors configured to perform the method of one or more of Aspects 1 through 8.

Aspect 11: An apparatus for wireless communication, comprising at least one means for performing the method of one or more of Aspects 1 through 8.

Aspect 12: A non-transitory computer-readable medium storing code for wireless communication, the code comprising instructions executable by a processor to perform the method of one or more of Aspects 1 through 8.

Aspect 13: A non-transitory computer-readable medium storing a set of instructions for wireless communication, the set of instructions comprising one or more instructions that, when executed by one or more processors of a device, cause the device to perform the method of one or more of Aspects 1 through 8.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for wireless communication, comprising:
a memory; and
one or more processors, coupled to the memory, configured to:
identify, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values;
determine a frequency contribution based at least in part on comparing a first observed gain associated with a reference frequency of the set of frequency values and a second observed gain associated with a target frequency,
wherein the first observed gain and the second observed gain are dependent on an operating temperature of the analog component;
determine a temperature contribution based at least in part on comparing a first characterization gain value, of the set of characterization gain values, associated with a reference temperature of the set of temperature values, and a second characterization gain value, of the characterization gain values, associated with a target temperature;
determine a gain offset for the target temperature and the target frequency based at least in part on combining the frequency contribution and the temperature contribution; and
configure the gain offset, associated with the target temperature and the target frequency, for the analog component.

2. The device of claim 1, wherein the one or more processors are further configured to:
determine the first observed gain and the second observed gain while the analog component is associated with the target temperature.

3. The device of claim 2, wherein the one or more processors, to determine the first observed gain and the second observed gain while the analog component is associated with the target temperature, are configured to:
calibrate the analog component;
determine the first observed gain while the analog component operates at the reference frequency and the target temperature; and
determine the second observed gain while the analog component operates at the target frequency and the target temperature.

4. The device of claim 1, wherein the one or more processors are further configured to:
determine the second characterization gain value using a given temperature value of the set of temperature values, wherein the given temperature value is closer to the target temperature than any other temperature value of the set of temperature values.

5. The device of claim 1, wherein the set of temperature values span an operating temperature range of the analog component.

6. The device of claim 1, wherein the set of frequency values span an operating frequency range of the analog component.

7. The device of claim 1, wherein the one or more processors are further configured to:
receive a first signal indicating the target temperature;
receive a second signal indicating the first observed gain; and
receive a third signal indicating the second observed gain.

8. The device of claim 7, further comprising:
a temperature component configured to provide the first signal.

9. The device of claim 1, further comprising the analog component.

10. The device of claim 1, wherein the one or more processors, to configure the gain offset for the analog component associated with the target temperature and the target frequency, are configured to:
configure a table or a function identifying gain offsets for combinations of target temperatures and target frequencies.

11. A method, comprising:
identifying, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values;
determining a frequency contribution based at least in part on comparing a first observed gain associated with a reference frequency of the set of frequency values and a second observed gain associated with a target frequency,
wherein the first observed gain and the second observed gain are dependent on an operating temperature of the analog component;
determining a temperature contribution based at least in part on comparing a first characterization gain value, of the set of characterization gain values, associated with a reference temperature of the set of temperature values, and a second characterization gain value, of the characterization gain values, associated with a target temperature;
determining a gain offset for the target temperature and the target frequency based at least in part on combining the frequency contribution and the temperature contribution; and
configuring the gain offset, associated with the target temperature and the target frequency, for the analog component.

12. The method of claim 11, further comprising:
determining the first observed gain and the second observed gain while the analog component is associated with the target temperature.

13. The method of claim 12, wherein determining the first observed gain and the second observed gain while the analog component is associated with the target temperature further comprises:
calibrating the analog component;
determining the first observed gain while the analog component operates at the reference frequency and the target temperature; and
determining the second observed gain while the analog component operates at the target frequency and the target temperature.

14. The method of claim 11, further comprising:
determining the second characterization gain value using a given temperature value of the set of temperature values, wherein the given temperature value is closer to the target temperature than any other temperature value of the set of temperature values.

15. The method of claim 11, wherein the set of temperature values span an operating temperature range of the analog component.

16. The method of claim 11, wherein the set of frequency values span an operating frequency range of the analog component.

17. The method of claim 11, further comprising:
receiving a first signal indicating the target temperature;
receiving a second signal indicating the first observed gain; and
receiving a third signal indicating the second observed gain.

18. The method of claim 11, wherein configuring the gain offset for the analog component associated with the target temperature and the target frequency further comprises:
configuring a table or a function identifying gain offsets for combinations of target temperatures and target frequencies.

19. A non-transitory computer-readable medium storing a set of instructions for wireless communication, the set of instructions comprising:
one or more instructions that, when executed by one or more processors of a device, cause the device to:
identify, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values;
determine a frequency contribution based at least in part on comparing a first observed gain associated with a reference frequency of the set of frequency values and a second observed gain associated with a target frequency,
wherein the first observed gain and the second observed gain are dependent on an operating temperature of the analog component;
determine a temperature contribution based at least in part on comparing a first characterization gain value, of the set of characterization gain values, associated with a reference temperature of the set of temperature values, and a second characterization gain value, of the characterization gain values, associated with a target temperature;
determine a gain offset for the target temperature and the target frequency based at least in part on combining the frequency contribution and the temperature contribution; and
configure the gain offset, associated with the target temperature and the target frequency, for the analog component.

20. The non-transitory computer-readable medium of claim 19, wherein the one or more instructions further cause the device to:
determine the first observed gain and the second observed gain while the analog component is associated with the target temperature.

21. The non-transitory computer-readable medium of claim 20, wherein the one or more instructions, that cause the device to determine the first observed gain and the second observed gain while the analog component is associated with the target temperature, cause the device to:
calibrate the analog component;
determine the first observed gain while the analog component operates at the reference frequency and the target temperature; and
determine the second observed gain while the analog component operates at the target frequency and the target temperature.

22. The non-transitory computer-readable medium of claim 19, wherein the one or more instructions further cause the device to:
determine the second characterization gain value using a given temperature value of the set of temperature values, wherein the given temperature value is closer to the target temperature than any other temperature value of the set of temperature values.

23. The non-transitory computer-readable medium of claim 19, wherein the set of temperature values span an operating temperature range of the analog component.

24. The non-transitory computer-readable medium of claim 19, wherein the set of frequency values span an operating frequency range of the analog component.

25. The non-transitory computer-readable medium of claim 19, wherein the one or more instructions further cause the device to:
receive a first signal indicating the target temperature;
receive a second signal indicating the first observed gain; and
receive a third signal indicating the second observed gain.

26. The non-transitory computer-readable medium of claim 19, wherein the one or more instructions, that cause the device to configure the gain offset for the analog component associated with the target temperature and the target frequency, cause the device to:
configure a table or a function identifying gain offsets for combinations of target temperatures and target frequencies.

27. An apparatus for wireless communication, comprising:
means for identifying, for a set of frequency values and a set of temperature values, a set of characterization gain values associated with an analog component, wherein a characterization gain value, of the set of characterization gain values, identifies a gain value corresponding to a frequency value of the set of frequency values and a temperature value of the set of temperature values;
means for determining a frequency contribution based at least in part on comparing a first observed gain associated with a reference frequency of the set of frequency values and a second observed gain associated with a target frequency,
wherein the first observed gain and the second observed gain are dependent on an operating temperature of the analog component;
means for determining a temperature contribution based at least in part on comparing a first characterization gain value, of the set of characterization gain values, associated with a reference temperature of the set of temperature values, and a second characterization gain value, of the characterization gain values, associated with a target temperature;
means for determining a gain offset for the target temperature and the target frequency based at least in part on combining the frequency contribution and the temperature contribution; and
means for configuring the gain offset, associated with the target temperature and the target frequency, for the analog component.

28. The apparatus of claim 27, further comprising:
means for determining the first observed gain and the second observed gain while the analog component is associated with the target temperature.

29. The apparatus of claim 28, wherein the means for determining the first observed gain and the second observed gain while the analog component is associated with the target temperature further comprises:
means for calibrating the analog component;
means for determining the first observed gain while the analog component operates at the reference frequency and the target temperature; and
means for determining the second observed gain while the analog component operates at the target frequency and the target temperature.

30. The apparatus of claim 27, further comprising:
means for determining the second characterization gain value using a given temperature value of the set of temperature values, wherein the given temperature value is closer to the target temperature than any other temperature value of the set of temperature values.

\* \* \* \* \*